(12) United States Patent
Sardi

(10) Patent No.: US 10,935,114 B2
(45) Date of Patent: Mar. 2, 2021

(54) ACTUATOR POSITION SENSOR MECHANISM

(71) Applicant: Ratier-Figeac SAS, Figeac (FR)

(72) Inventor: Adil Sardi, Capdenac (FR)

(73) Assignee: RATIER-FIGEAC SAS, Figeac (FR)

( * ) Notice: Subject to any disclaimer, the term of this patent is extended or adjusted under 35 U.S.C. 154(b) by 288 days.

(21) Appl. No.: 16/029,762

(22) Filed: Jul. 9, 2018

(65) Prior Publication Data

US 2019/0085955 A1    Mar. 21, 2019

(51) Int. Cl.

| F16H 25/20 | (2006.01) |
| G01D 11/24 | (2006.01) |
| G01D 5/04 | (2006.01) |
| B64C 13/28 | (2006.01) |

(52) U.S. Cl.
CPC .......... *F16H 25/2015* (2013.01); *G01D 5/04* (2013.01); *G01D 11/245* (2013.01); *B64C 13/28* (2013.01)

(58) Field of Classification Search
CPC .................. B64C 13/28; G01D 5/04
See application file for complete search history.

(56) References Cited

U.S. PATENT DOCUMENTS

| 7,464,896 B2 | 12/2008 | Carl et al. |
| 8,960,031 B2 | 2/2015 | Keech et al. |
| 2002/0050756 A1 | 5/2002 | Ito |
| 2008/0203223 A1 | 8/2008 | Cyrot et al. |
| 2011/0067511 A1* | 3/2011 | Pettersson ........... F16H 25/2015 74/89.28 |
| 2016/0312867 A1 | 10/2016 | Larson et al. |

FOREIGN PATENT DOCUMENTS

| EP | 1701063 A1 | 9/2006 |
| JP | 05116900 A | 5/1993 |

OTHER PUBLICATIONS

Extended European Search Report for International Application No. 17306211.8 dated Mar. 14, 2018, 6 pages.

* cited by examiner

*Primary Examiner* — Daniel S Larkin
(74) *Attorney, Agent, or Firm* — Cantor Colburn LLP

(57) ABSTRACT

The system of the present disclosure replaces the reduction gearbox of a conventional system with a screw shaft and nut system wherein the position of the nut feeds into a linear sensor that determines the stabilizer position based on the nut position. The screw shaft and nut system in the position sensor train is reflective of the screw shaft and nut system and the stabilizer movement end of the assembly whereby rotation of the shaft causes axial movement of the nut along the shaft.

4 Claims, 3 Drawing Sheets

ACTUATOR POSITION SENSOR MECHANISM

FOREIGN PRIORITY

This application claims priority to European Patent Application No. 17306211.8 filed Sep. 18, 2017, the entire contents of which is incorporated herein by reference.

TECHNICAL FIELD

The present disclosure relates to an actuator mechanism for moving a component relative to a structure and sensing the component position, for example, but not limited to, for moving a moveable part in an aircraft e.g. a flap or a stabilizer. The actuator mechanism of the disclosure finds application, for example, in a trimmable horizontal stabiliser actuator (THSA), but this is just one example.

BACKGROUND

Mechanical actuators find use in a very wide range of fields and applications for causing movement of a component in response to a control command through a drive path. In the example of an actuator to control horizontal stabilizers at an aircraft tail, to adjust the longitudinal pitch or 'trim' of the aircraft, conventionally a so-called ball screw actuator is used. As described further below, with reference to FIG. 1, such actuators are arranged to be driven by a drive means such as a motor which causes a screw shaft to rotate. A nut mounted on the screw shaft is caused to move linearly relative to the shaft in response to rotation of the shaft. The nut is coupled to the stabilizer to move the stabilizer relative to the tail. The actuator needs to monitor the position of the stabilizer (i.e. monitor the position of the nut which is indicative of the position of the stabilizer. Conventionally, this is done by means of a position sensor assembly. The screw shaft is coupled, e.g. via a gear wheel, to a sensor wheel such that rotation of the shaft causes rotation of the sensor wheel. The sensor wheel rotates a sensor wheel shaft which is coupled to a stabilizer position sensor via a reduction gearbox (also sometimes called a mini-reducer).

A problem that has been identified with such conventional actuator systems is that the position measuring cannot be performed directly on the output from the actuator assembly, and some movement conversion, e.g. by amplification or reduction gear mechanisms, is required in the path from the actuator to the sensor. This results in a complex, bulky system that is difficult and expensive to manufacture, and that can suffer from inaccuracies in position sensing.

There is, therefore, a need for a smaller, simpler, more accurate position sensor train that avoids these problems.

SUMMARY

The system of the present disclosure replaces the reduction gearbox (a multiple stage gear train) with a screw shaft and nut system wherein the position of the nut feeds into a linear sensor that determines the stabilizer position based on the nut position. The screw shaft and nut system in the position sensor train is reflective of the screw shaft and nut system and the stabilizer movement end of the assembly whereby rotation of the shaft causes axial movement of the nut along the shaft.

Accordingly, there is provided an actuator position measurement assembly comprising a sensor screw shaft arranged to engage and rotate with a screw shaft of an actuator, and a nut mounted on the sensor screw shaft that moves axially with respect to the sensor screw shaft, and a linear sensor coupled to the nut to provide an output indicative of the axial position of the nut.

The actuator position measurement assembly is preferably coupled as part of an actuator assembly wherein the actuator comprises an actuator screw shaft on which is mounted an actuator nut, the actuator screw shaft arranged to be rotated in response to an actuator control signal and wherein rotation of the actuator screw shaft causes a relative axial movement of the actuator nut along the shaft, and wherein the actuator screw shaft is coupled, e.g. via a gear mechanism, to the sensor screw shaft to cause corresponding rotation of the sensor screw shaft.

Preferably, the actuator nut is coupled to, e.g. via a link mechanism, a component to be moved by the actuator according to the actuator control signal.

DETAILED DESCRIPTION

Figure 1:
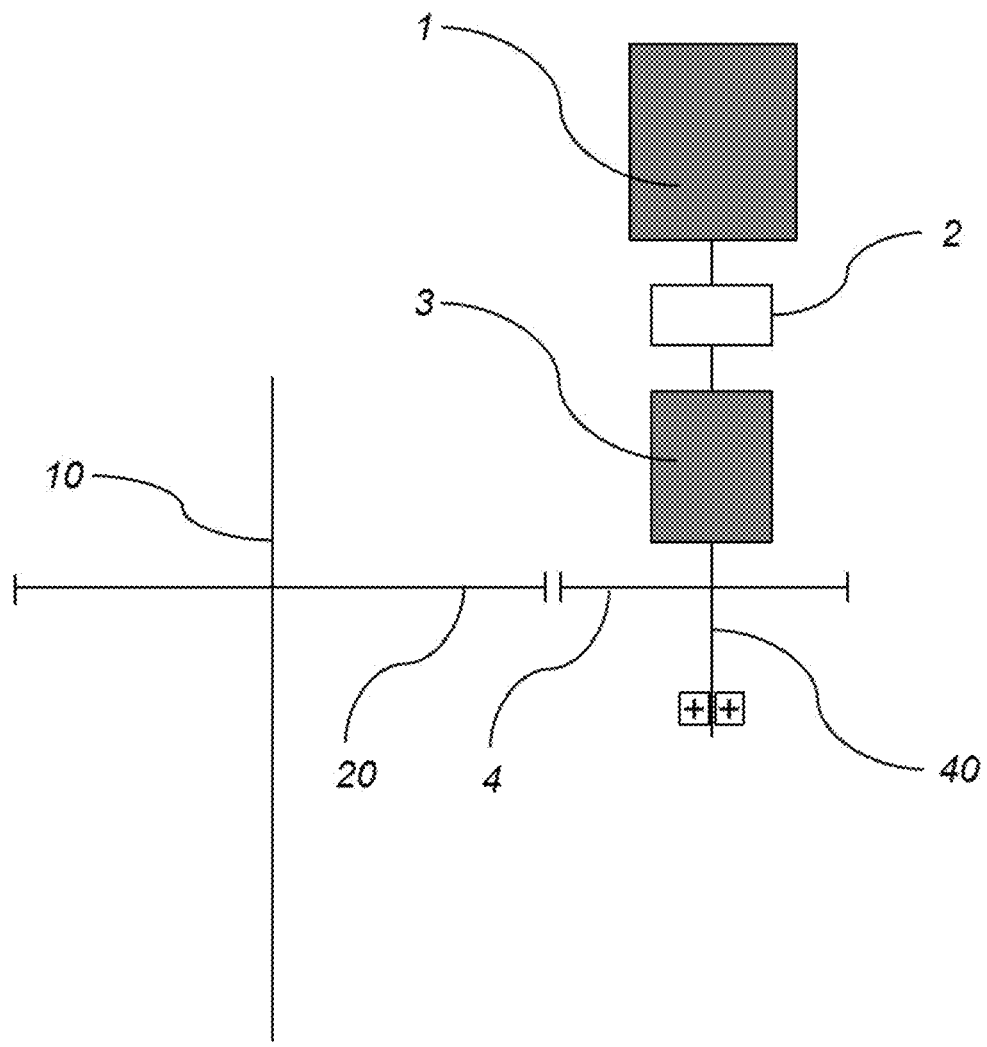
FIG. 1 is a schematic diagram of a conventional position measurement system for an actuator assembly.
Figure 2:
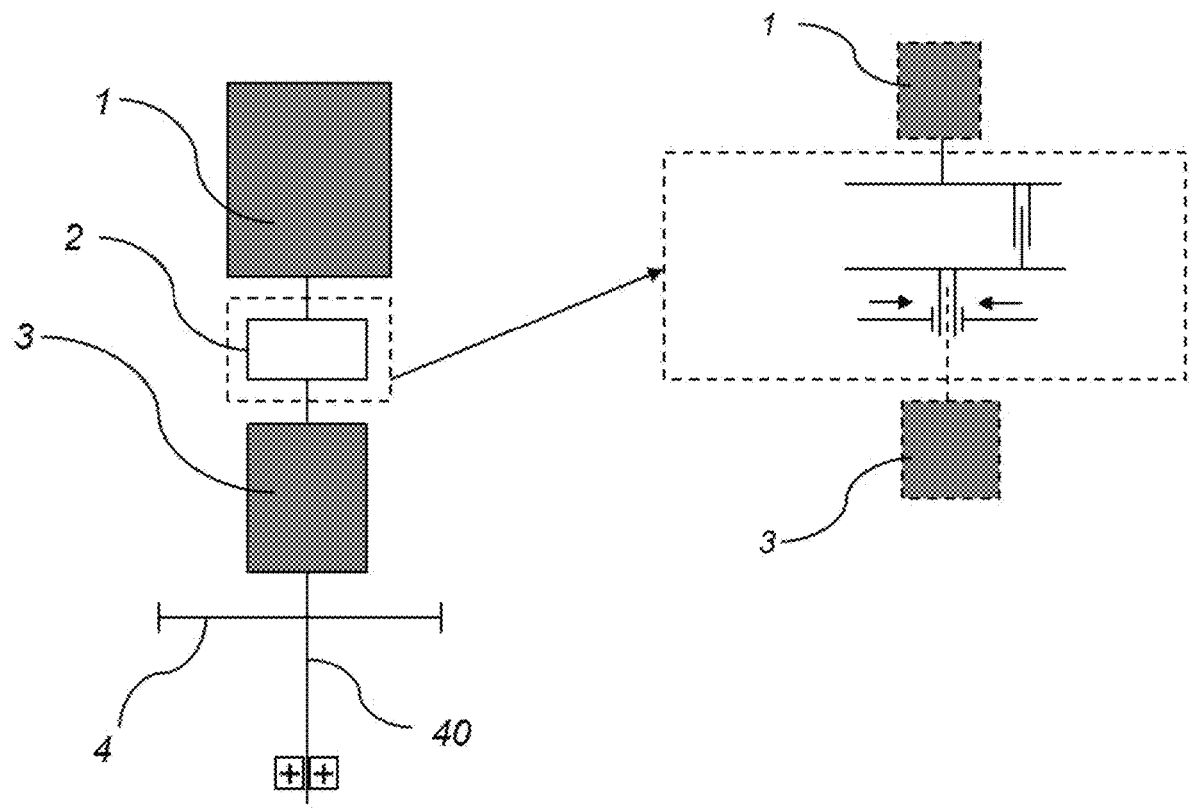
FIG. 2 is a more detailed schematic diagram of the position sensor gear train of a system, such as shown in FIG. 1, with a detail of the coupling device.
Figure 3:
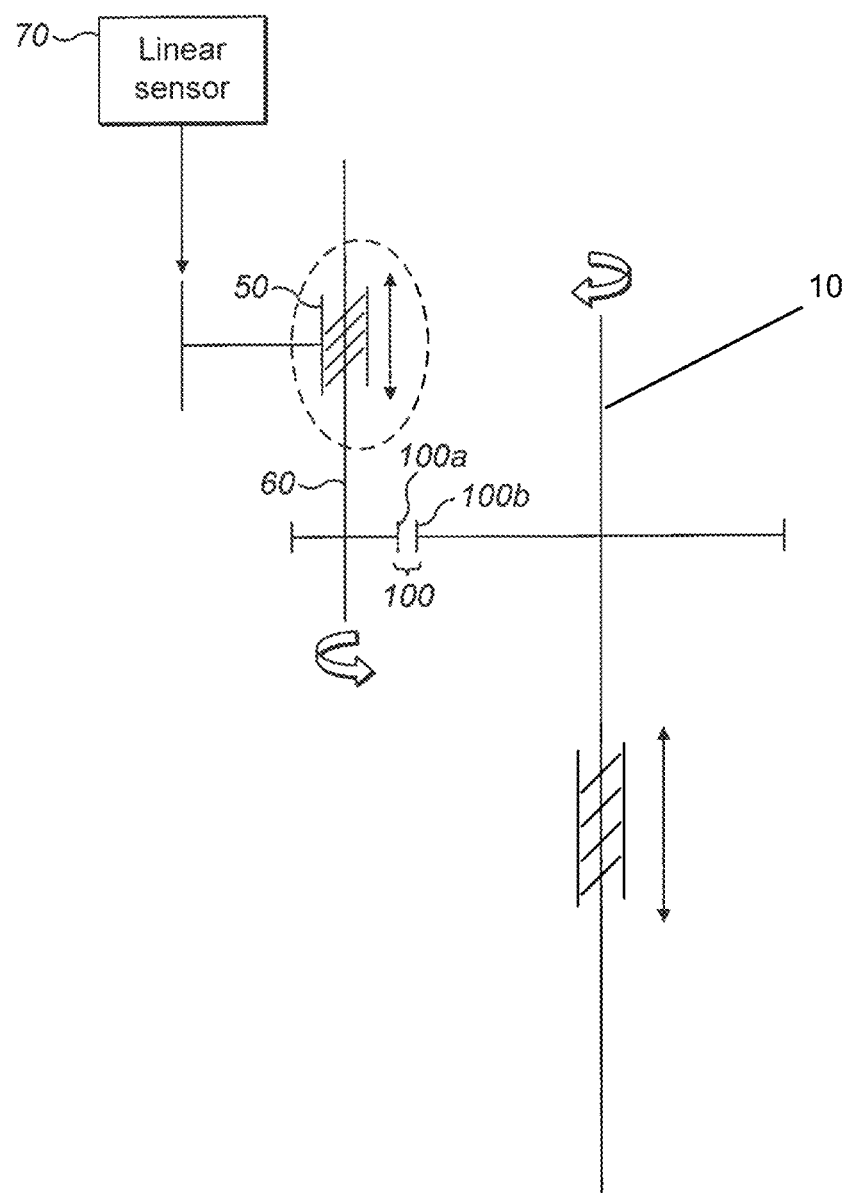
FIG. 3 is a schematic view of a modified assembly according to the present disclosure.

Referring first to FIGS. 1 and 2, conventional systems will first be described. As briefly described above, in a conventional system, the actuator mechanism comprises an actuator screw shaft 10 that rotates in accordance with a position control signal, e.g. from a motor or other control. In an aircraft, for example, this control signal could be generated automatically from flight controls, or mechanically by e.g. movement of a lever by a pilot. Rotation of the actuator screw shaft 10 causes axial movement of an actuator nut (not shown) mounted on the shaft. The actuator nut is coupled to the component to be moved, e.g. the horizontal stabilizer, so that the control command causes the shaft to rotate which causes the nut to move axially which causes corresponding movement of the stabilizer or other component to be moved.

It is necessary, for safe and reliable control, to measure or determine the position of the stabilizer during its movement. This is performed by the position sensor assembly which determines the position of the actuator nut, and hence the stabilizer, by monitoring the rotation of the actuator screw shaft 10. The position sensor assembly is coupled to the rotating actuator screw shaft, e.g. via a gear mechanism comprising an actuator screw shaft gear wheel 20 in intermeshing engagement with a sensor wheel 4 of the sensor assembly. Rotation of the actuator screw shaft therefore causes rotation of the actuator screw shaft gear wheel 20 which in turn causes rotation of the sensor wheel 4. Rotation of the sensor wheel 4 causes rotation of a sensor shaft 40 on which the sensor wheel is mounted.

The sensor shaft is therefore coupled to a reduction gear box 3 which, in turn, is connected to a position sensor 1 via a coupling device 2. A preferred coupling device is shown in more detail in the dashed line extract of FIG. 2. This combined reduction train of the reduction gear box and coupling device provides an encoded position indication to the position sensor from which the position sensor 1 can determine the rotation of the actuator screw shaft and, hence, the actuator nut and, hence the component to be moved (not shown). Problems with such conventional systems have been outlined above.

The system of the present disclosure replaces the reduction gearbox and coupling device and the rotary sensor with a linear sensor assembly that has a linearly moveable component e.g. a sensor nut 50 mounted to and caused to move axially with respect to a rotary component e.g. a sensor screw shaft 60 on which the linearly moveable component is mounted. A linear sensor detects the axial position of the linearly moveable component 50.

In an actuator system, the rotary component, shaft 60, engages with and rotates in response to rotation of the actuator screw shaft 10. As with conventional systems, the sensor shaft 60 may engage with the actuator screw shaft 10 via a gear mechanism 100 similar to the wheels of the conventional system. Thus, rotation of the actuator shaft 10 (which moves the actuator nut, which moves the stabilizer or the like) causes, via an actuator gear wheel 100*b* and a sensor gear wheel 100*a*, a corresponding rotation of the sensor shaft 60 which causes a corresponding axial movement of the sensor nut 50 which is detected by the linear sensor 70.

The position sensing system provides a smaller, lighter, simpler and more accurate position measurement system that can be manufactured more easily and at lower cost. The construction of the position sensor assembly also mirrors the constructions of the actuator assembly.

The disclosure has been in relation to an example of a position measuring assembly and actuator assembly used for e.g. controlling the position of a horizontal stabilizer in an aircraft. The system described could, of course, also be used in other applications where a component is to be moved/positioned via an actuator.

The invention claimed is:

1. An actuation system comprising:
an actuator assembly comprising:
an actuator screw shaft on which is mounted an actuator nut, the actuator screw shaft arranged to be rotated in response to an actuator control signal;
wherein rotation of the actuator screw shaft causes a relative axial movement of the actuator nut along the shaft; and
an actuator position measurement assembly comprising:
a sensor rotary member arranged to engage and rotate with the actuator screw shaft, and a sensor linearly moveable element mounted on the sensor rotary member that moves axially with respect to the sensor rotary member; and
a linear sensor coupled to the linearly moveable element to provide an output indicative of the axial position of the linearly moveable element;
wherein the actuator screw shaft is coupled to the sensor rotary member to cause corresponding rotation of the sensor rotary member.

2. The actuation system of claim 1, wherein the actuator assembly is coupled to the actuator position measurement assembly via a gear mechanism.

3. The actuation system of claim 2, wherein the gear mechanism comprises an actuator gear wheel rotatably coupled to the actuator screw shaft and a sensor gear wheel rotatably coupled to the sensor rotary member, the actuator gear wheel and the sensor gear wheel in intermeshing rotary engagement.

4. An actuation system as claimed in claim 2, further comprising a component to be moved, the component to be moved coupled to the actuator nut.

* * * * *